(12) United States Patent  
Pratt

(10) Patent No.: US 8,511,952 B2
(45) Date of Patent: Aug. 20, 2013

(54) DUAL-ACTION DISPOSABLE CLAMP

(75) Inventor: John D. Pratt, Laguna Niguel, CA (US)

(73) Assignee: Monogram Aerospace Fasteners, Inc., Los Angeles, CA (US)

( * ) Notice: Subject to any disclaimer, the term of this patent is extended or adjusted under 35 U.S.C. 154(b) by 862 days.

(21) Appl. No.: 11/973,278

(22) Filed: Oct. 5, 2007

(65) Prior Publication Data

US 2008/0213063 A1 Sep. 4, 2008

Related U.S. Application Data

(60) Provisional application No. 60/849,515, filed on Oct. 5, 2006, provisional application No. 60/857,700, filed on Nov. 8, 2006, provisional application No. 60/901,171, filed on Feb. 13, 2007.

(51) Int. Cl.
*F16B 13/06* (2006.01)

(52) U.S. Cl.
USPC .................................... 411/34; 411/39

(58) Field of Classification Search
USPC ................ 411/39, 40, 15, 34, 38, 42, 43, 55, 411/5
See application file for complete search history.

(56) References Cited

U.S. PATENT DOCUMENTS

| 612,316 | A | | 10/1898 | Downes |
|---|---|---|---|---|
| 748,078 | A | | 12/1903 | Kaisling |
| 2,282,711 | A | | 5/1942 | Eklund |
| 2,409,352 | A | * | 10/1946 | Gill ................................. 411/38 |
| 2,763,314 | A | | 9/1956 | Gill |
| 2,863,351 | A | * | 12/1958 | Vaughn ........................... 411/28 |
| 2,915,934 | A | | 12/1959 | La Torre |
| 2,971,425 | A | * | 2/1961 | Blakeley ......................... 411/28 |
| 3,085,463 | A | | 4/1963 | Lay |
| 3,136,203 | A | | 6/1964 | Davis |
| 3,236,143 | A | | 2/1966 | Wing |
| 3,253,495 | A | * | 5/1966 | Orloff ............................ 411/34 |
| 3,258,887 | A | * | 7/1966 | Mostoller ........................ 52/98 |
| 3,277,771 | A | * | 10/1966 | Reynolds ........................ 411/39 |
| 3,322,449 | A | | 5/1967 | Becker |
| 3,345,900 | A | | 10/1967 | Villo |

(Continued)

FOREIGN PATENT DOCUMENTS

| DE | 20 2006 012 668 | 11/2006 |
|---|---|---|
| EP | 1889688 | 2/2008 |
| WO | WO 01/04499 A2 | 1/2001 |
| WO | WO 2008/045360 A2 | 4/2008 |

OTHER PUBLICATIONS

International Search Report from PCT/US2009/039083.
International Search Report from PCT/US2008/080114.

(Continued)

*Primary Examiner* — Flemming Saether
(74) *Attorney, Agent, or Firm* — Woodard, Emhardt, Moriarty, McNett & Henry LLP

(57) ABSTRACT

A clamp and a method for installing the clamp into at least two work pieces is provided. The clamp has a shank keyed to an expander. The expander engages the core bolt such that rotation of the core bolt bulbs the expander to clamp the work pieces. A spacer engages the shank to prevent rotation of the shank during installation. The shank has a flange fracturing at a predetermined compression load. The core bolt optionally has a first and a second break groove fracturing at predetermined compression loads. A nut is optionally provided to engage the spacer.

21 Claims, 9 Drawing Sheets

(56) References Cited

U.S. PATENT DOCUMENTS

| | | |
|---|---|---|
| 3,461,771 A | 8/1969 | Briles |
| 3,505,921 A | 4/1970 | Wigam |
| 4,007,659 A * | 2/1977 | Stencel ............................ 411/34 |
| 4,015,505 A * | 4/1977 | Murray ........................ 411/80.6 |
| 4,033,222 A | 7/1977 | Wilson |
| 4,112,813 A * | 9/1978 | Kuhlmann et al. ............. 411/49 |
| 4,122,753 A | 10/1978 | Kuhlmann et al. |
| 4,168,650 A | 9/1979 | Dahl et al. |
| 4,203,346 A | 5/1980 | Hall et al. |
| 4,237,768 A | 12/1980 | Volkmann |
| 4,263,834 A | 4/1981 | Dudash |
| 4,457,652 A | 7/1984 | Pratt |
| 4,519,735 A | 5/1985 | Machtle |
| 4,579,491 A | 4/1986 | Kull |
| 4,602,902 A | 7/1986 | Herb |
| 4,659,271 A * | 4/1987 | Pratt et al. ........................ 411/43 |
| 4,692,076 A | 9/1987 | Herb |
| 4,714,391 A | 12/1987 | Bergner |
| 4,747,204 A | 5/1988 | Pratt |
| 4,752,169 A * | 6/1988 | Pratt ............................... 411/43 |
| 4,772,167 A | 9/1988 | Beals |
| 4,854,793 A * | 8/1989 | Ollivier et al. .................. 411/49 |
| 4,865,499 A * | 9/1989 | Lacey .............................. 411/34 |
| 4,875,815 A * | 10/1989 | Phillips, II ...................... 411/38 |
| 4,929,134 A | 5/1990 | Bergner |
| 4,950,115 A | 8/1990 | Sadri |
| 4,979,857 A | 12/1990 | Wing |
| 4,984,945 A | 1/1991 | Bergner |
| 4,988,247 A | 1/1991 | Summerlin |
| 5,030,050 A | 7/1991 | Auriol |
| 5,044,849 A | 9/1991 | Starke |
| 5,066,179 A * | 11/1991 | Pratt ............................... 411/34 |
| 5,152,648 A | 10/1992 | Pratt |
| 5,213,460 A | 5/1993 | Sadri et al. |
| 5,486,079 A * | 1/1996 | Martin et al. ................. 411/392 |
| 5,498,110 A | 3/1996 | Stencel et al. |
| 5,569,005 A | 10/1996 | Millington |
| 5,603,592 A | 2/1997 | Sadri et al. |
| 5,620,287 A | 4/1997 | Pratt |
| 5,634,751 A * | 6/1997 | Stencel et al. ................... 411/43 |
| 5,651,649 A | 7/1997 | Sadri et al. |
| 5,759,001 A | 6/1998 | Smith |
| 5,779,410 A | 7/1998 | Lautenschlager |
| 5,816,761 A * | 10/1998 | Cassatt et al. .................... 411/34 |
| 5,947,667 A | 9/1999 | Cassatt et al. |
| 6,007,009 A | 12/1999 | Sheridan et al. |
| 6,062,783 A | 5/2000 | Austin |
| 6,062,788 A * | 5/2000 | Ying-Feng .................... 411/480 |
| 6,213,697 B1 * | 4/2001 | Uejima ........................... 411/30 |
| 6,224,309 B1 * | 5/2001 | Yamamoto ..................... 411/11 |
| 6,247,883 B1 | 6/2001 | Monserratt |
| 6,537,005 B1 | 3/2003 | Denham |
| 6,547,500 B2 | 4/2003 | Cosenza |
| 6,746,191 B2 | 6/2004 | Edland |
| RE38,664 E * | 11/2004 | Luhm ............................. 411/43 |
| 6,868,757 B2 | 3/2005 | Hufnagl et al. |
| 6,893,196 B2 | 5/2005 | Wille |
| 6,896,460 B2 | 5/2005 | Enomoto |
| 6,935,821 B2 | 8/2005 | Bodin et al. |
| 7,681,426 B2 | 3/2010 | Main et al. |
| 8,075,234 B2 | 12/2011 | McClure |
| 2002/0146298 A1 | 10/2002 | Cosenza et al. |
| 2003/0183045 A1 | 10/2003 | Junkers |
| 2004/0022596 A1* | 2/2004 | Belanger ......................... 411/34 |
| 2004/0033119 A1 | 2/2004 | Hufnagl et al. |
| 2005/0123372 A1 | 6/2005 | Sato |
| 2005/0201845 A1 | 9/2005 | Keenen |
| 2006/0062650 A1 | 3/2006 | Kenner |
| 2007/0243035 A1* | 10/2007 | Pratt ............................... 411/15 |
| 2007/0243037 A1 | 10/2007 | Pratt |
| 2008/0044252 A1 | 2/2008 | Scheinberger et al. |

OTHER PUBLICATIONS

International Search Report and Written Opinion from PCT/US2010/028832.
International Search Report and Written Opinion from PCT/US2010/042317.
Extended European Search Report from EP07839322.0 filed Oct. 5, 2007.
Non-Final Office Action received in related U.S. Appl. No. 12/098,857, mailed Dec. 3, 2010.
Office Action dated Feb. 16, 2012 received in related U.S. Appl. No. 12/098,857, filed Apr. 7, 2008.

* cited by examiner

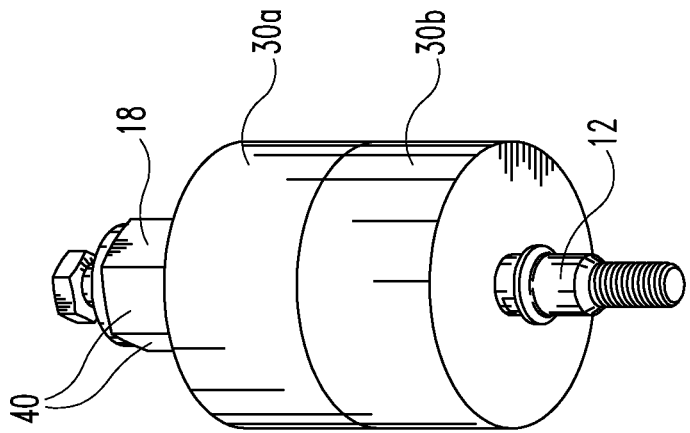
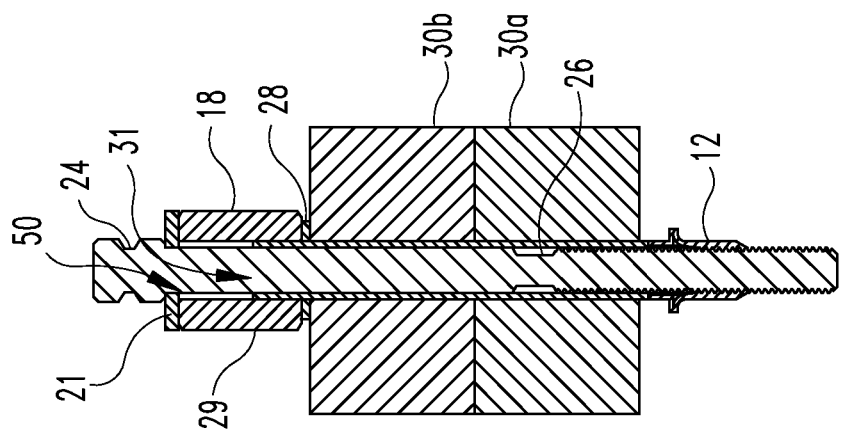
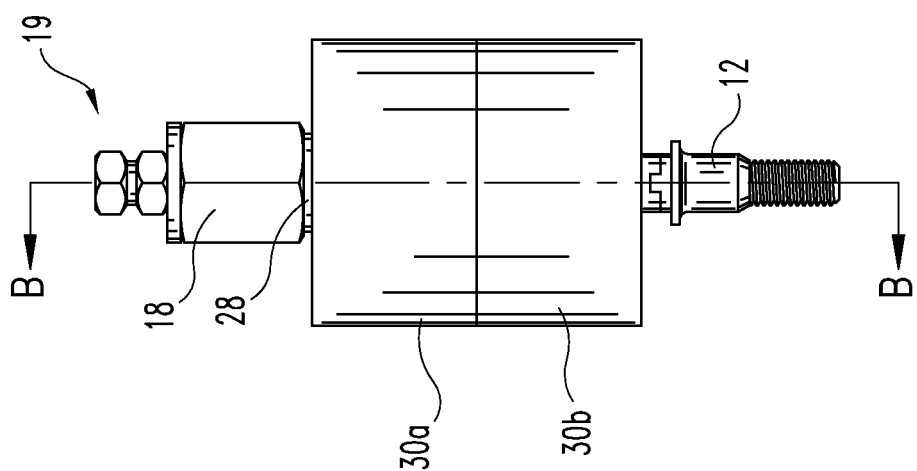

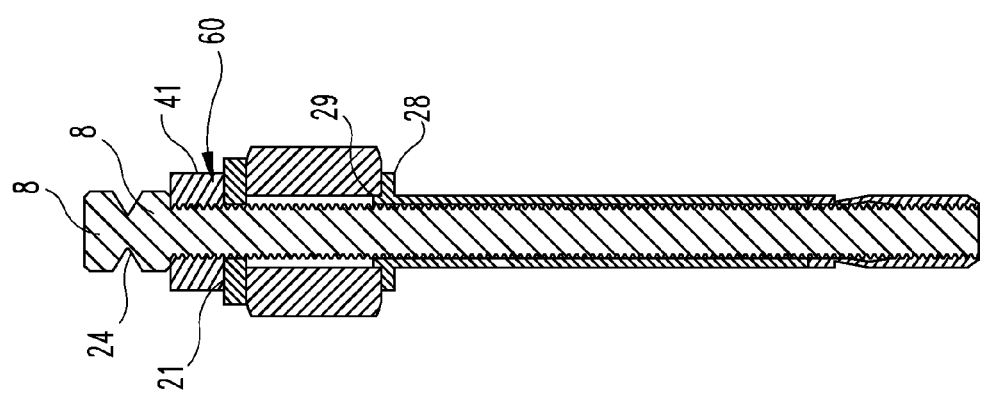
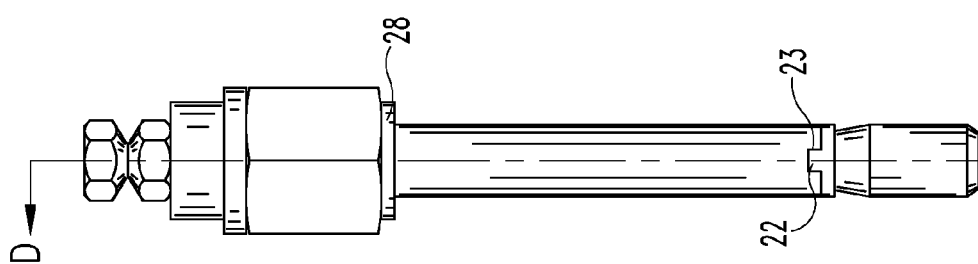

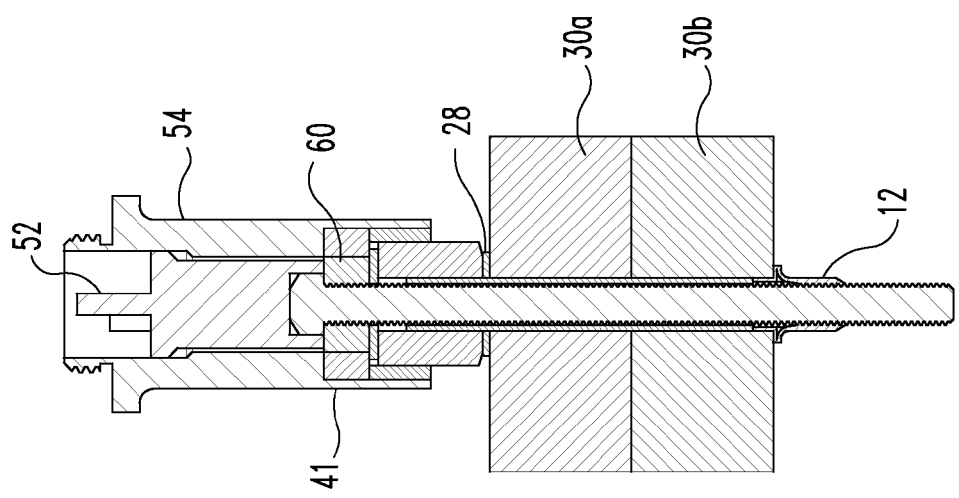
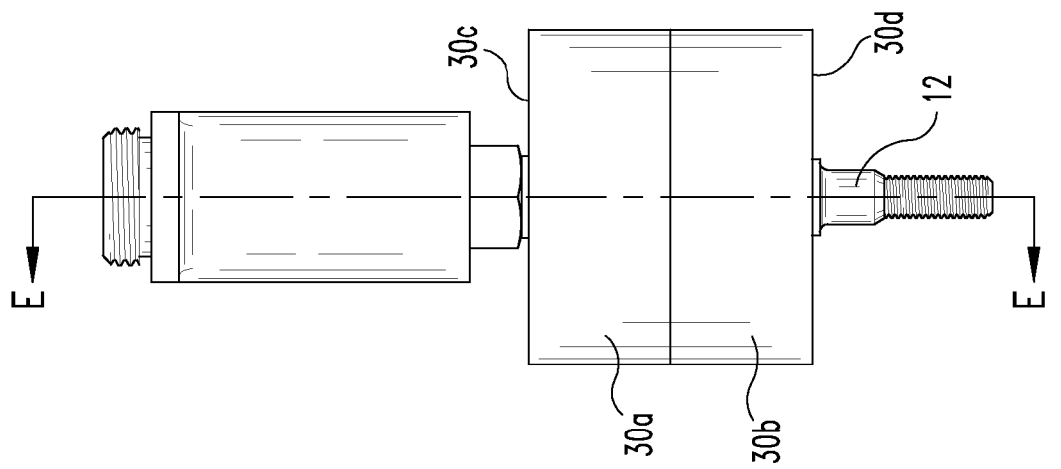
Fig. 5A
Fig. 5B

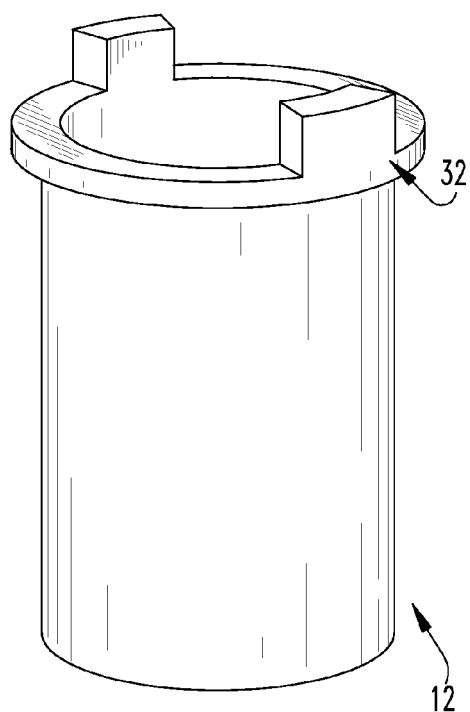
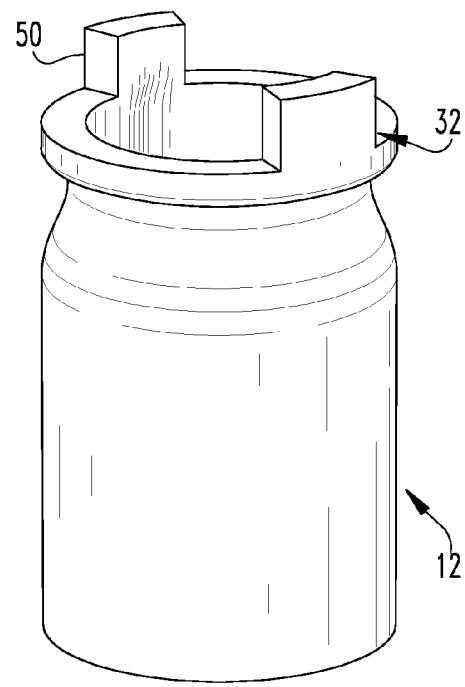
Fig. 8     Fig. 9
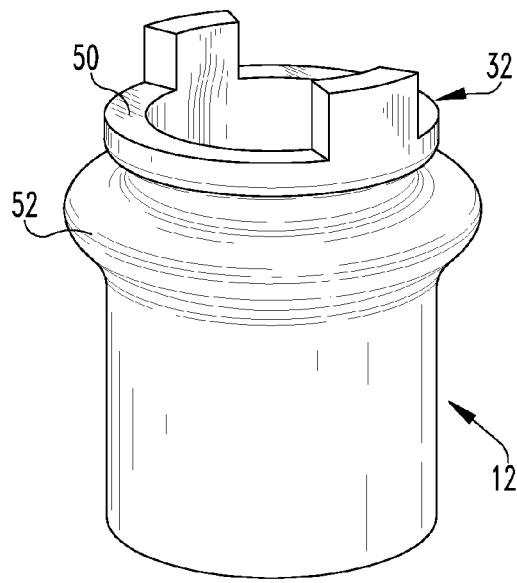
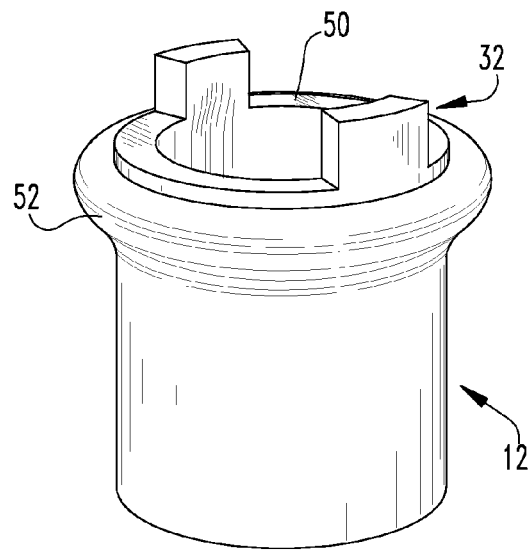
Fig. 10     Fig. 11

DUAL-ACTION DISPOSABLE CLAMP

This application claims priority from U.S. Provisional Patent Application No. 60/849,515 entitled "DUAL-ACTION DISPOSABLE CLAMP" filed on Oct. 5, 2006; U.S. Provisional Patent Application No. 60/857,700 entitled "DUAL-ACTION DISPOSABLE CLAMP" filed on Nov. 8, 2006; and U.S. Provisional Patent Application No. 60/901,171 entitled "DUAL-ACTION DISPOSABLE CLAMP WITH CLUTCH NUT" filed on Feb. 13, 2007, which are each hereby incorporated by reference in their entirety.

FIELD OF THE INVENTION

The present invention relates to a temporary fastener, and more specifically to a disposable clamp.

BACKGROUND OF THE INVENTION

Modern aircraft are manufactured from numerous panels and other parts that are fastened together with rivets, screws, bolts, and other permanent fasteners. To aid in assembly, parts are typically held together with temporary clamps and fixtures until permanent fasteners can be installed. Parts that incorporate sealant on the mating surfaces require that the temporary clamps exert sufficient force to squeeze excessive sealant from the joint while pulling parts together before the sealant fully cures. Heavy structures fastened with 5/16"-size permanent fasteners, for example, require in excess of 500 pounds clamp load to squeeze the sealant out to an acceptable thickness and hold the components together. Other applications, such as in wing-to-body joints, require upwards of 1500 pounds with 5/16"-size fasteners to temporarily secure components. The clamp load requirements for other sizes are generally proportional to the cross-sectional area of the basic fastener diameter.

Blind hole clamps are desirable for airframe assembly, because their installation and removal can be more easily automated than the installation and removal of conventional bolts and nuts. However, existing blind hole clamps do not have a blind head large enough to avoid surface damage on the blind side panel when high clamp loads are imparted.

Oftentimes, one or more work pieces are joined with clamps to maintain part orientation during an autoclave curing cycle. Threaded-type reusable blind clamps are capable of high clamp loads, but lack the smooth shank needed to avoid clogging with resin as the parts are cured. As a result, the clamps are difficult to remove and may damage the work pieces upon removal. Blind tack rivets may have the required smooth shank but are incapable of imparting sufficient clamp load to maintain parts in the required orientation. Conventional slave bolts are not capable of automated installation and removal.

In addition, threaded temporary blind clamps are easily clogged with sealant and resins, making removal from assemblies difficult and necessitating cleaning before they may be reused. Another problem with threaded temporary fasteners is that they protrude above the accessable panel surface by a relatively large amount. Accordingly, robotic assembly equipment must retract or back away from each panel to avoid collisions with installed clamps. As a result, installation of threaded temporary fasteners requires additional time to traverse from one location to another.

Finally, the clamping capability of threaded temporary clamps is limited, because the blind head is discontinuous and high clamp loads result in surface damage to the work pieces. Temporary blind tack rivets have a low profile but must be removed by drilling through the manufactured head. Drilling through the head, however, generates metal chips that frequently damages panel surfaces. Oftentimes, for example, the rivet spins in the hole during the drilling operation, halting the advance of the drill bit through the tack rivet and prolonging the removal cycle time. Tack rivets also have very low clamp loads and produce a blind-side upset that is not suitable for use in laminated composite panels.

Slave bolts may consist of a conventional nut and bolt or a pull-type lock bolt with a swage collar. Slave bolts may provide a non-clogging shank, non-drill out removal and high clamp loads. However, slave bolts require access to both sides of the work pieces and, in many cases, two operators to install. Two-sided installations are difficult and costly to automate.

Therefore, a need exists for a clamp, or a temporary fastener, having a smooth cylindrical shank without grooves, threads and other discontinuities that may become clogged with sealant or cured resin and which is capable of high clamp loads (greater than 500 pounds for a 5/16" size clamp) without damaging fragile panel surfaces. In addition, a need exists for a low profile temporary clamping fastener capable of installation and removal from a single accessible side of the work pieces, preferably by robotic equipment, in a manner that does not generate drilling debris. A one-sided installation and removal process is desired for saving labor costs over a conventional two-person operation using nuts and bolts. Finally, a need exists for a temporary fastener having a predetermined geometry to control installation clamp loads rather than allowing the installation force to be controlled by outside influences, such as, operator skill.

SUMMARY OF INVENTION

A clamp may having a core bolt in threaded engagement with an expander is provided. The clamp may have a smooth shank positioned between the expander and a wrenching end of the core bolt. The shank may have an integral flange adjacent the fracturing at a predetermined compression load. The core bolt may have a first and a second break groove capable of fracturing at predetermined compression loads. A spacer may be engaged with the shank to prevent rotation of the shank during installation of the clamp. A nut may optionally be provided. The nut may be in threaded engagement with the core bolt and may rotate with the core bolt during installation.

BRIEF DESCRIPTION OF THE SEVERAL VIEWS OF THE DRAWING

Objects and advantages together with the operation of the invention may be better understood by reference to the following detailed description taken in connection with the following illustrations, wherein:

FIGS. 2A, 2B and 2C illustrate a side view, a perspective view, and a cross-sectional view along line B-B of the clamp of FIGS. 1A-1C at least partially installed in a work piece in an embodiment of the present invention.

FIGS. 4A and 4B illustrate a side view and a cross-sectional view along line D-D of a clamp having a clutch nut in an embodiment of the present invention.

FIGS. 5A and 5B illustrate a side view and a cross-sectional view along line E-E of the clamp of FIGS. 4A and 4B with a wrenching tool engaged in an embodiment of the present invention.

FIG. 8 shows a representative perspective view of an uncrimped expander component in an embodiment of the present invention.

FIG. 9 shows a representative perspective view of an expander component as crimped in an embodiment of the present invention.

FIG. 10 shows a representative perspective view of an expander component as partially formed in an embodiment of the present invention.

FIG. 11 shows a representative perspective view of an expander component as completely formed in an embodiment of the present invention.

DETAILED DESCRIPTION OF THE INVENTION

Figure 1C:
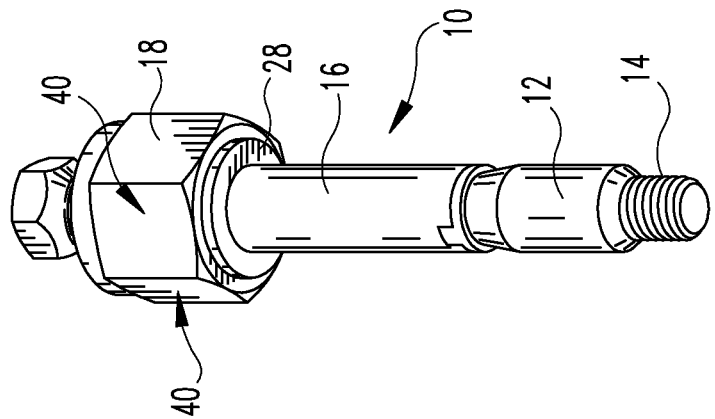
FIGS. 1A, 1B and 1C illustrate a side view, a perspective view, and a cross-sectional view along line A-A of a clamp in an embodiment of the present invention.

Referring now to the drawings, and in particular to FIGS. 1A-3C, a clamp 10 is illustrated generally comprising: a core bolt 14 in threaded engagement with an expander 12, a shank 16, a spacer 18 and a thrust washer 21. The expander 12 is positioned at a first end of the core bolt 14 such that the core bolt 14 is movable through the expander 12. Specifically, applying torque to the core bolt 14 drives the core bolt 14 through the expander 12. The core bolt 14 may have wrenching portions 8 on head portion 19 that are sized and shaped to be rotated by, for example, a wrenching tool. In one embodiment, the expander 12 is internally threaded and is in meshing engagement with external threads of the core bolt 14.

Figure 3C:
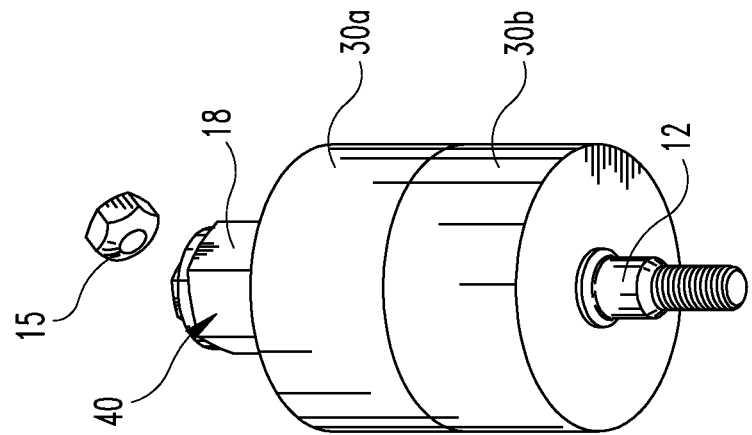
FIGS. 3A, 3B and 3C illustrate a side view, a perspective view and a cross-sectional view along line C-C of the clamp of FIGS. 1A-1C in an installed condition in an embodiment of the present invention.
Figure 3B:
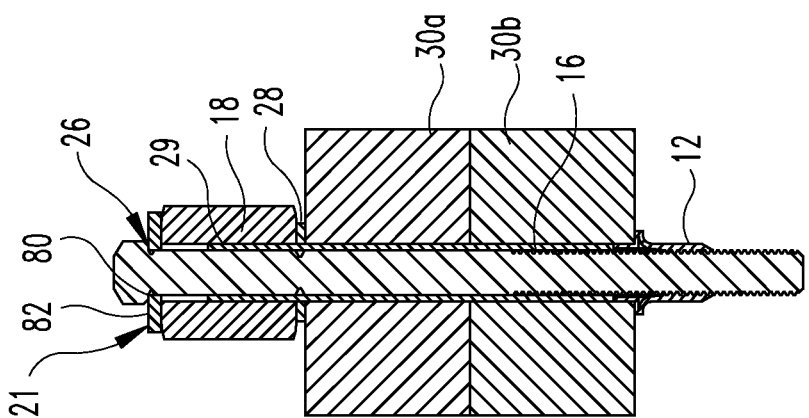
Figure 3A:
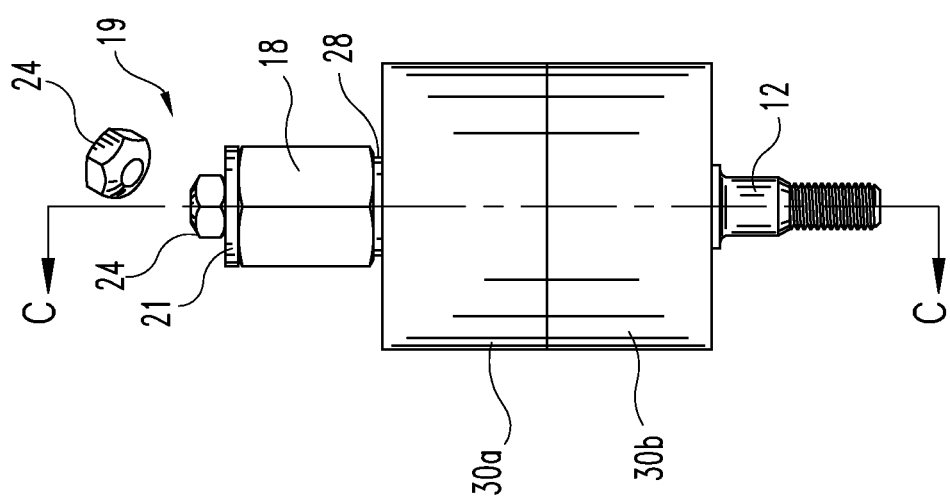
Figure 6A:
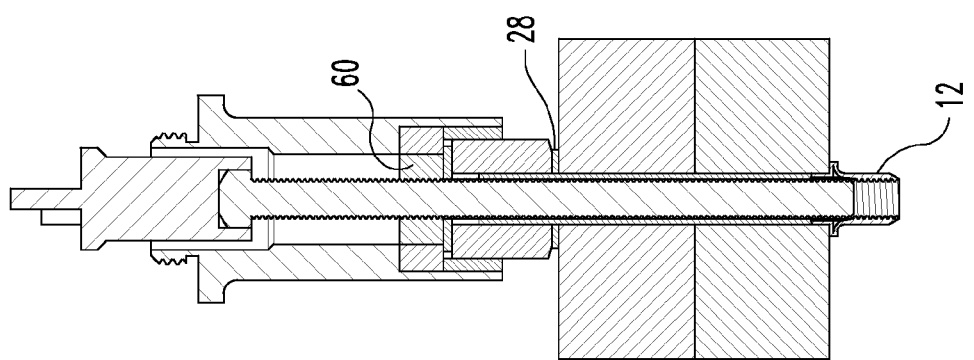
FIGS. 6A and 6B illustrate a side view and a cross-sectional view along line F-F of the clamp of FIGS. 4A and 4B with a wrenching tool engaged where the clamp may be removed from the work piece in an embodiment of the present invention.
Figure 6B:
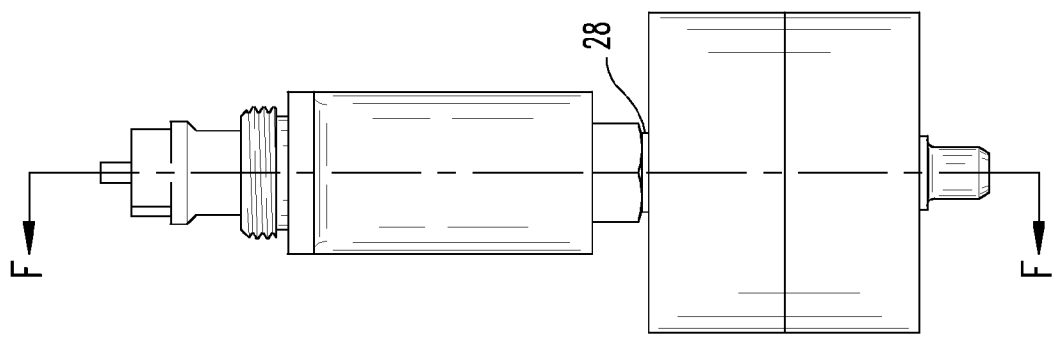

In a preferred embodiment, a first break groove 24 is positioned at a second end of the core bolt 14, opposite the expander 12. A second break groove 26 is positioned between the first break groove 24 and the first end of the core bolt 14. The first break groove 24 and the second break groove 26 may be weakened portions of the core bolt 14 that fail at predetermined torque or compression loads. In an exemplary embodiment, the first break groove 24 is sized to fail prior to the second break groove 26, as shown in FIGS. 3A-3C. For example, at a torque sufficient to clamp work pieces 30a, 30b together a desired amount, the first break groove 24 fractures and a portion of the core bolt 14 is severed. The second break groove 26 will remain intact until it is desired to remove the core bolt 14 from the work pieces 30a, 30b. To do so, additional torque may be provided on the core bolt 14 to fracture the core bolt 14 at the second break groove 26.

Figure 1B:
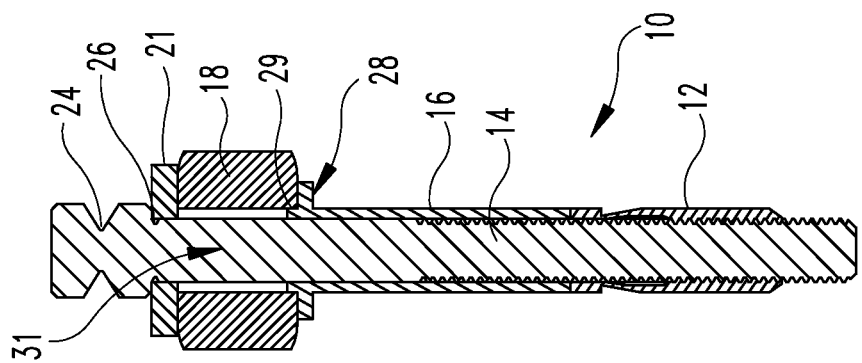

As discussed above, FIGS. 1-3 disclose 3 sequential stages of installation of clamp 10. In FIGS. 1B and 3B, second break groove 26 is illustrated as a groove under head portion 19. In FIG. 2B, second break groove 26 is illustrated as a larger, dog bone shaped region above the threads on core bolt 14. The balance of the disclosed structures are the same in FIGS. 1-3. The variations in the break groove structures are presented as alternative embodiments of break groove styles and locations.

Figure 1A:
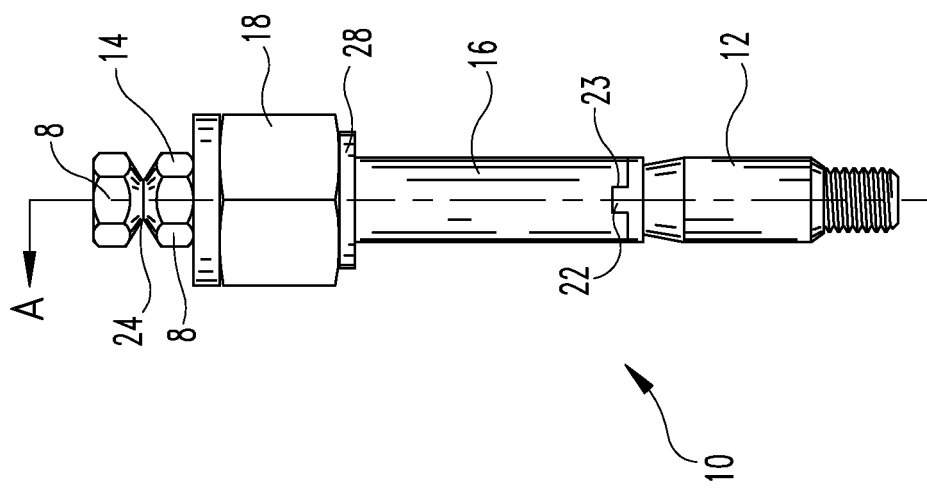

A shank 16 may be positioned between the first end of the core bolt 14 and the expander 12. In a preferred embodiment, the expander 12 may be rotationally keyed to the shank 16 such that rotation of the shank 16 rotates the expander 12, as shown in FIGS. 1A-1C. In the illustrated embodiment, expander 12 includes key 22 mated in channel 23 on shank 16. The mated connection between key 22 and channel 23 permits continued rotational keying between expander 12 and shank 16 in the event shank 16 is longitudinally displaced with respect to expander 12. The threaded core bolt 14 slides inside the shank 16 along the length of the core bolt 14. As torque is applied to the core bolt 14, the core bolt 14 rotates in the shank 16 and threads into the expander 12 as shown in FIGS. 2A-3C. The core bolt 14 moves through the expander 12 causing the expander 12 to bulb or to expand to a size in which the expander 12 has a larger diameter than the diameter of the shank 16 and the diameter of the core bolt 14.

The shank 16 has a flange 28 extending outward from the outer diameter of the shank 16. The flange 28 may be an enlarged portion extending in a direction perpendicular to the length of the shank 16. In a preferred embodiment, the flange 28 is integrally formed with the shank 16. The flange 28 may be sized such that the flange 28 limits the amount of the clamp 10 that may be inserted into the work pieces 30a, 30b. At a predetermined axial load, the flange 28 shears loose from the shank 16 and may allow the clamp 10 to move further into the work pieces 30a, 30b.

A spacer 18 may be positioned at an end of the shank 16. In an embodiment, the spacer 18 engages a flange 28 of the shank 16 and may prevent rotation of the shank 16 when torque is applied to the core bolt 14. The spacer 18 may have wrenching flats 40 for engagement with wrenching tools, for example, a tool to prevent rotation of the shank 16. The spacer 18 may have a bore 31 in which the core bolt 14 may extend there through.

A protuberance or boss 29 may extend from an end of the shank 16 opposite the expander 12. The spacer 18 may be positioned at an end of the shank 16 adjacent the protuberance 29. The bore 31 of the spacer 18 may be an interference fit with the protuberance 29 of the shank 16 such that the shank 16 is rotationally restrained. The protuberance 29 of the shank 16 extends into and frictionally fits within the spacer 18. In an embodiment, the protuberance 29 and the bore 31 in the spacer 18 are non-circular to rotationally key the shank 16 and the spacer 18 together. For example, the bore 31 and the protuberance 29 may have corresponding shapes such that relative rotation is prevented. The spacer 18 may be positioned such that the underside of the spacer 18 abuts the flange 28 of the shank 16.

A washer 21 may be positioned between the spacer 18 and an end of the core bolt 14. In one embodiment, the washer 21 may be a thrust washer to spread the compressive stresses over a larger area than without the washer 21. Bearing surfaces 80 of the core bolt 14 may bear against a top side 82 of the washer 21, as best illustrated in FIG. 3B. In another embodiment, the washer 21 may be bowed to act as a spring washer, for example, to maintain compressive loads on the work pieces 30a, 30b.

Figure 7:
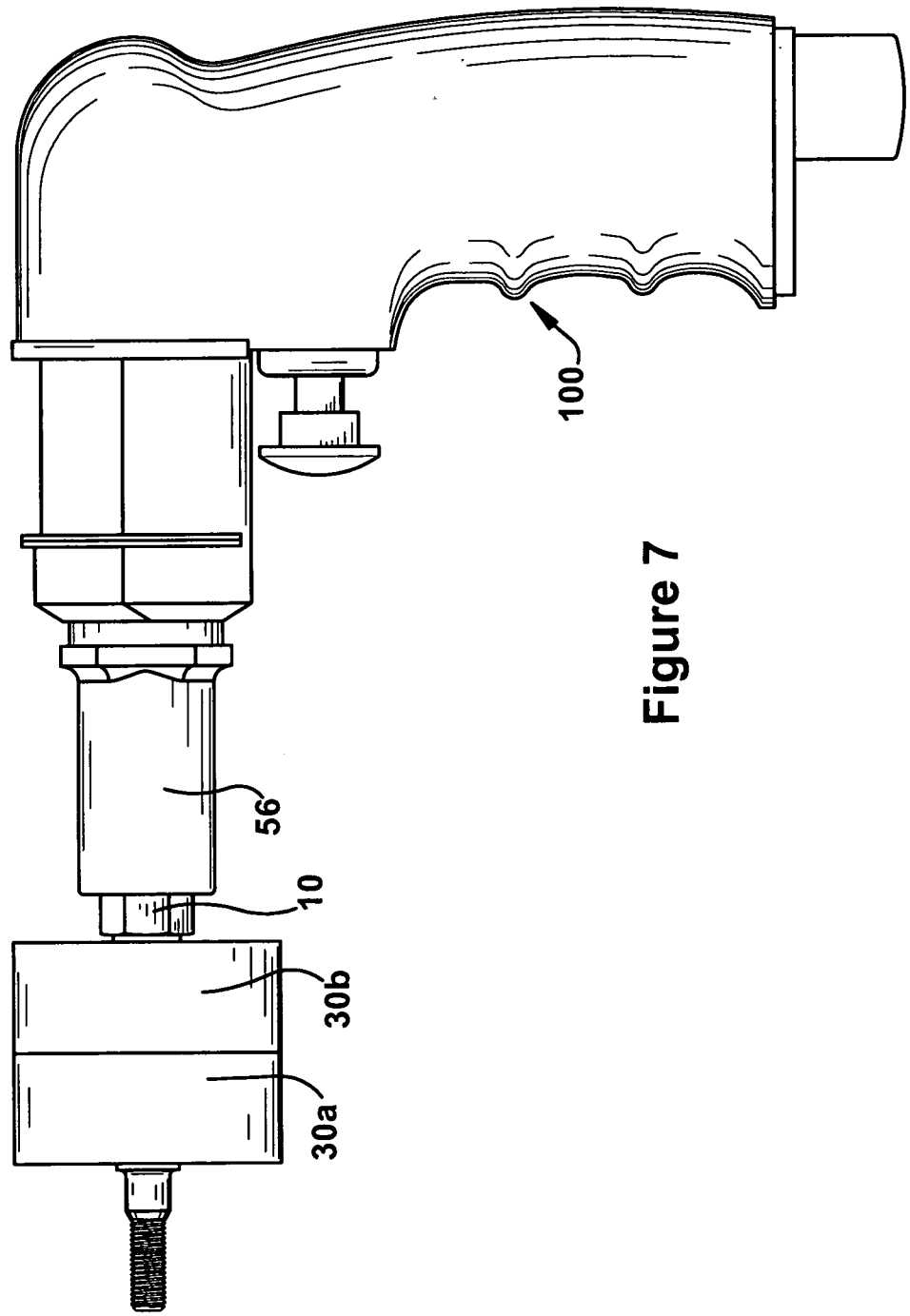
FIG. 7 illustrates a power tool engaged with the clamp of FIGS. 1A through 1C in an embodiment of the present invention.

The clamp 10 may be installed by an automated process or by automated equipment, such as robotic equipment. For example, after inserting the clamp 10 into aligned apertures in the work pieces 30a, 30b, a tool 100 may engage the spacer 18 and the wrenching surfaces 40 of the spacer 18. In one embodiment, the clamp 10 may be inserted into a top surface 30c of the work piece 30a and may extend through to a blind side 30d of the work piece 30b as illustrated in FIG. 5A. Of course, if the clamp 10 is inserted into the blind side 30d, then the top surface 30c may be referred to as the blind side. In one embodiment, the tool 100 may have a first component 54 for rotationally restraining the spacer 18, which, in turn, prevents the shank 16 from rotating as illustrated in FIG. 7. The tool 100 may have a second component 56 to provide torque to the core bolt 14. The tool 100 may be used by or incorporated into robotic or other automated equipment to thread the core bolt 14 into the expander 12 and cause the expander 12 to bulb or otherwise enlarge. Once the expander 12 is fully bulbed, as shown in an embodiment in FIGS. 3A-3C, the compressive load on the shank 16 increases until the flange 28 on the shank 16 shears loose at a predetermined compressive load. In one embodiment, the flange 28 shears at a load of 1000 Epounds for a 5/16" size fastener. Continued rotation of the core bolt 14 causes the shank 16, with the expander 12 attached, to translate into the spacer 18 until the expander 12 contacts and clamps against the far side of the work pieces 30a, 30b. If the flange 28 shears loose, the torque required to drive the core bolt 14 may drop to a negligible amount or nearly zero, but the torque required to drive the core bolt 14 may increase as the expander 12 contacts and clamps the work pieces 30a, 30b together.

The installation of the clamp 10 may be controlled by controlling the installation torque, or by use of the first break groove 24 and the second break groove 26. For example, when the torsion required to continue rotating the core bolt 14 exceeds the strength of the first break groove 24, a portion 15 of the core bolt 14 severs as shown in FIGS. 3A-3C; and the installation may be complete as shown in FIGS. 4A and 4B. To facilitate removal of the clamp 10, the tool 100 may be applied to the core bolt 14 to apply torque and rotate the core bolt 14. At a predetermined amount of torque, the second break groove 26 fails and the spacer 18, the washer 21, and the shank 16 are discarded from the accessible-side of the work pieces 30a, 30b. The expander 12 and remaining portion of the core bolt 14 may be pushed through the work pieces 30a, 30b and discarded or otherwise moved through the work pieces 30a, 30b.

Advantageously, the tool 100 may be used to install and to remove the clamp 10. To this end, the clamp 10 may effectively be used as a temporary fastener for clamping panels and other objects together. In addition, drilling to remove the clamp 10 is eliminated. Accordingly, the damage caused by off-center drilling and the generation of metal chips caused by drilling are eliminated.

Figure 12:
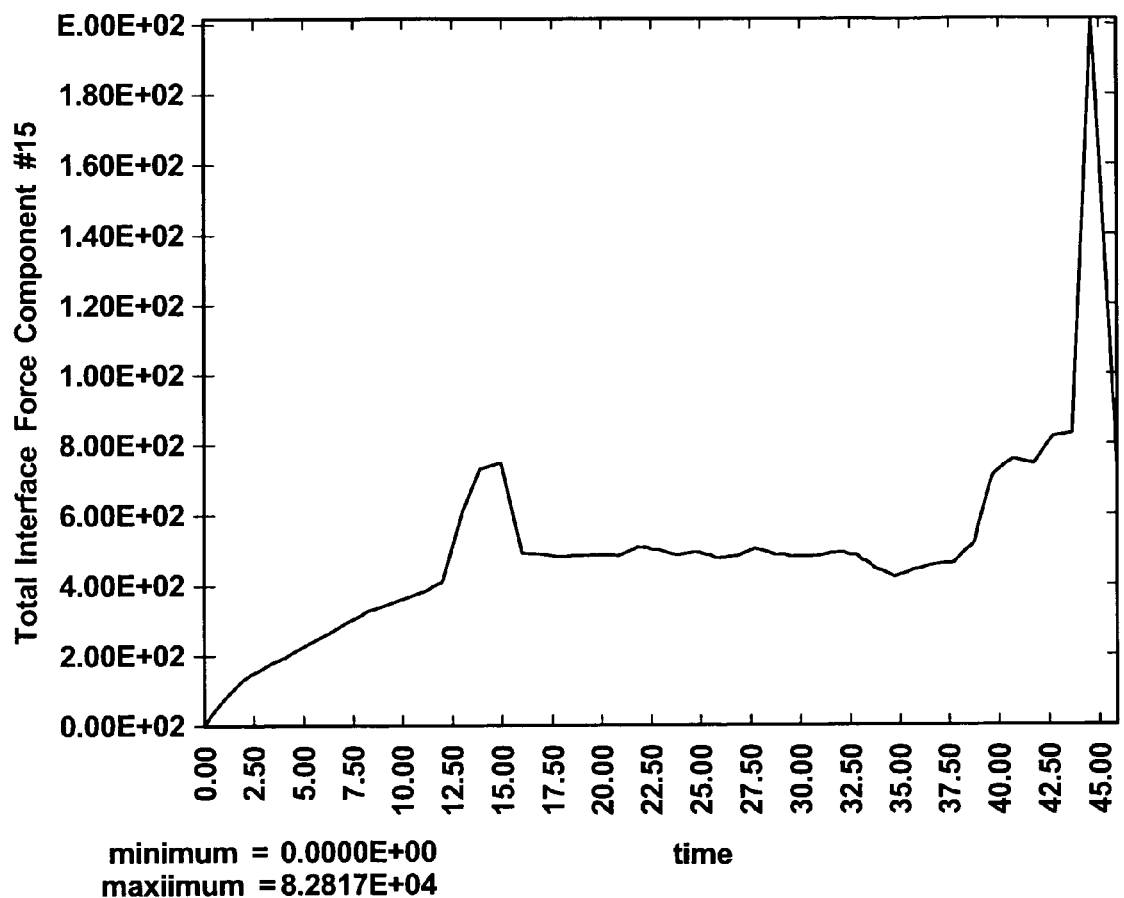
FIG. 12 illustrates a graph of a predictable load curve of an expander in an embodiment of the present invention.

In addition, the bulbing nature of the expander 12 ensures that clamp loads are spread over a relatively large area to avoid damaging the work pieces 30a, 30b. The pre-bulbed geometry of the expander 12 ensures that the apertures of the work pieces 30a, 30b do not become rounded or otherwise damaged. In an embodiment, the expander 12 may have a flanged end 32, as illustrated in FIGS. 8-11. The flanged end 32 may be crimped inwardly during manufacture as best shown in FIG. 9. In a preferred embodiment, the expander 12 may have a thicker-walled leading edge 50 that resists buckling and a thin-walled bulbing region 52 that begins bulbing slightly inside the apertures of the work pieces 30a, 30b such that edge interference is avoided, as illustrated in FIGS. 10 and 11. FIG. 12 illustrates a predicted load curve with bulbing of the expander 12 indicated at approximately eight hundred pounds for a 5/16" size clamp. Of course, the clamp 10 may be modified to change the load in which bulbing occurs as will be appreciated by one of ordinary skill in the art.

Advantageously, the clamp 10 avoids clogging with resins and other sealants due to the cylindrical and smooth shape of the shank 16. The design, shape and size of the clamp 10 allows incorporation of the clamp 10 into many applications where known rivets and clamps are not suitable, such as, in use with composite material cured in autoclave.

The grip range of the clamp 10 may correspond to or may be controlled by the length of the spacer 18. For example, the spacer 18 may have a length sufficient to receive the shank 16 after the flange 28 shears loose. A low profile for efficient robotic applications is possible by limiting the grip range. For example, a 5/16"-size clamp having a 3/8" gripping range may have an installed protrusion approximately one inch above the accessible-side of the work pieces 30a, 30b.

In another embodiment, the clamp 10 has a nut 60 that is at least partially engaged with the core bolt 14 as illustrated in FIGS. 4A-6B. In such an embodiment, the core bolt 14 may be threaded from the end adjacent the expander 12 to the wrenching portions 8. Accordingly, the nut 60 may be in threaded engagement with the core bolt 14. The nut 60 may be, for example, cylindrical and internally-threaded. In one embodiment, the nut 60 may be positioned between the flange 28 of the shank 16 and the spacer 18. Upon installation, the nut 60 may freely rotate with the core bolt 14 and may act as an extension of a head portion 19 of the core bolt 14. In a preferred embodiment, the nut 60 is threaded in one direction.

During removal of the clamp 10, the nut 60 may be fixed and prevented from rotation by, for example, a clutch. An outer surface 41 of the nut 60, for example, may be engaged by a one-way clutch, a roller-type clutch or other structure that allows rotation of the nut 60 during installation but prevents rotation of the nut 60 when the core bolt 14 is rotated in the removal direction. Upon removal, the core bolt 14 unthreads from the nut 60 and the expander 12. The expander 12 may remain keyed to the shank 16 which remains keyed to the spacer 18.

In such an embodiment, the first break groove 24 may be incorporated into the clamp 10 and may be dependent upon whether the clamp 10 is configured for installation with torque-controlled tools. The second break groove 26 may be absent in this embodiment since removal may be accomplished by unthreading the core bolt 14 from the assembly, rather than fracturing the core bolt 14 to separate components of the clamp 10. Of course, the first break groove 24 and the second break groove 26 may be incorporated in such an embodiment as will be appreciated by one of ordinary skill in the art. Second break groove 26 and nut 60 in combination with threaded core bolt 14 as shown in FIG. 4B each define a means to separate the expander 12 from bearing surface 80 of core bolt 14.

Although the preferred embodiment of the present invention has been illustrated in the accompanying drawings and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

Having thus described the invention, I claim:

1. A blind clamp comprising:
   a core bolt comprising a first threaded portion on a first end and a wrenching feature adjacent a second end;
   an expanding nut comprising a second threaded portion in threaded engagement with said first threaded portion and a bulbing region, wherein said bulbing region bulbs to substantially increase its diameter upon application of a first compressive load;
   a spacer positioned proximate to said second end, wherein said spacer is constrained from longitudinally moving past said wrenching feature, and wherein said spacer defines a bore;

a shank positioned between said expanding nut and said spacer, wherein said shank is constructed and arranged to translate longitudinally through said bore;

a protuberance on said shank that extends into said bore; and a flange that blocks said shank from longitudinally advancing with respect to said spacer until a second compressive load is exerted, wherein said second compressive load is greater than said first compressive load.

2. The blind clamp of claim 1 wherein said flange is integrally formed on said shank.

3. The blind clamp of claim 1 wherein said spacer further comprises a wrench engaging portion and wherein said spacer, shank and expanding nut are substantially rotationally constrained together permitting rotation of said expanding nut to be constrained by engaging said wrench engaging portion.

4. The blind clamp of claim 1 further comprising a first weakened region on said core bolt that fractures at least a portion of said wrenching feature from said core bolt upon application of a first torsional load to said wrenching feature greater than a second torsional load that results in application of said second compressive load.

5. The blind clamp of claim 4 further comprising a second weakened region on said core bolt that fractures said core bolt and separates said first threaded portion from said core bolt upon application of a third torsional load, wherein said third torsional load is greater than said first torsional load.

6. The blind clamp of claim 1 further comprising a back-out nut comprising a third threaded portion threadingly engaged with said first threaded portion, wherein rotation of the core bolt in a first direction rotates the back-out nut in the same direction and wherein rotation of the core bolt in a second direction opposite the first direction unthreads the core bolt from the back-out nut and permits extraction of said core bolt from said expanding nut.

7. The blind clamp of claim 1 further comprising a weakened region on said core bolt that fractures said core bolt and separates said first threaded portion from said core bolt upon application of a first torsional load to said wrenching feature greater than a second torsional load that results in application of said second compressive load.

8. The blind clamp of claim 1, wherein said bore defined by said spacer has a substantially uniform diameter.

9. A blind clamp comprising:
a core bolt comprising a first threaded portion on a first end and a head including a bearing surface adjacent a second end;

an expanding nut comprising a second threaded portion in threaded engagement with said first threaded portion and a bulbing region, wherein said bulbing region bulbs to substantially increase its diameter upon application of a first compressive load and wherein said bearing surface on said head of said core bolt is on a lower surface of said head facing said expanding nut;

a spacer positioned proximate to said second end, wherein said spacer is constrained from longitudinally moving past said head, and wherein said spacer defines a bore;

a shank positioned between said expanding nut and said spacer, wherein said shank is constructed and arranged to translate longitudinally through said bore;

a flange that blocks said shank from longitudinally advancing with respect to said spacer until a second compressive load is exerted, wherein said second compressive load is greater than said first compressive load; and a removal structure constructed and arranged to separate said expanding nut and said bearing surface after said bulbing region is bulbed to substantially increase its diameter, wherein said removal structure is structurally part of the blind clamp.

10. The blind clamp of claim 9, wherein said removal structure comprises a weakened region on said core bolt that fractures said core bolt and separates said first threaded portion from said core bolt upon application of a first torsional load to said head greater than a second torsional load that results in application of said second compressive load.

11. The blind clamp of claim 9, wherein said removal structure comprises a back-out nut comprising a third threaded portion threadingly engaged with said first threaded portion, wherein rotation of the core bolt permits extraction of said core bolt from said expanding nut.

12. The blind clamp of claim 9, further comprising a protuberance on said shank that extends into said bore.

13. The blind clamp of claim 9, further comprising a mating key and channel that rotationally key said expander and said shank together.

14. The blind clamp of claim 13, wherein said mating key and channel rotationally key said expander and shank together during longitudinal displacement of said shank relative to said expander.

15. The blind clamp of claim 9, wherein said flange is integrally formed on said shank.

16. A blind clamp comprising:
a core bolt comprising a first threaded portion on a first end and a head adjacent a second end;

an expanding nut comprising a second threaded portion in threaded engagement with said first threaded portion and a bulbing region, wherein said bulbing region bulbs to substantially increase its diameter upon application of a first compressive load;

a spacer positioned proximate to said second end, wherein said spacer is constrained from longitudinally moving past said head, and wherein said spacer defines a bore;

a shank positioned between said expanding nut and said spacer, wherein said shank is constructed and arranged to translate longitudinally through said bore;

a flange that blocks said shank from longitudinally advancing with respect to said spacer until a second compressive load is exerted, wherein said second compressive load is greater than said first compressive load and wherein, upon application of said second compressive load, said flange shears loose and allows said shank to translate longitudinally through said bore; and a mating key and channel that rotationally key said expander and said shank together.

17. The blind clamp of claim 16, further comprising a weakened region on said core bolt that fractures said core bolt and separates said first threaded portion from said core bolt upon application of a first torsional load to said head greater than a second torsional load that results in application of said second compressive load.

18. The blind clamp of claim 16, further comprising a back-out nut comprising a third threaded portion threadingly engaged with said first threaded portion, wherein rotation of the core bolt permits extraction of said core bolt from said expanding nut.

19. The blind clamp of claim 16, further comprising a protuberance on said shank that extends into said bore.

20. The blind clamp of claim 16, wherein said mating key and channel rotationally key said expander and shank together during longitudinal displacement of said shank relative to said expander.

21. The blind clamp of claim 16, wherein said flange is integrally formed on said shank.

* * * * *

UNITED STATES PATENT AND TRADEMARK OFFICE
CERTIFICATE OF CORRECTION

PATENT NO. : 8,511,952 B2
APPLICATION NO. : 11/973278
DATED : August 20, 2013
INVENTOR(S) : John D. Pratt Page 1 of 1

It is certified that error appears in the above-identified patent and that said Letters Patent is hereby corrected as shown below:

In the Specification

In column 5, line 11, replace "Epounds" with --pounds--.

Signed and Sealed this
First Day of October, 2013

Teresa Stanek Rea
*Deputy Director of the United States Patent and Trademark Office*